United States Patent Office 3,766,192
Patented Oct. 16, 1973

---

3,766,192
N-(SUBSTITUTED INDAZOLYL-N¹-METHYL) ALKYLENEIMINES AND THEIR USE AS BIOCIDES
Pasquale Paul Minieri, Woodside, N.Y., assignor to Tenneco Chemicals, Inc.
No Drawing. Continuation-in-part of applications Ser. No. 689,812, Dec. 12, 1967, now Patent No. 3,641,050, dated Feb. 8, 1972, and Ser. No. 141,999, May 10, 1971. This application Nov. 22, 1971, Ser. No. 201,159
Int. Cl. C07d 49/18
U.S. Cl. 260—293.6     11 Claims

ABSTRACT OF THE DISCLOSURE

Compounds that have the structural formula

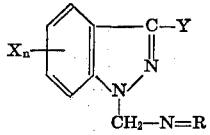

wherein X represents halogen, nitro, amino, acetamino, aroylamino, or (halobenzylidene)amino; Y represents hydrogen or halogen; R represents an alkylene group having from 4 to 8 carbon atoms; and n represents an integer in the range of zero to 2 can be used to control the growth of microorganisms. Illustrative of these compounds are N-(5-nitroindazolyl-N¹-methyl)hexamethyleneimine and N-(3-chloroindazolyl-N¹-methyl)piperidine.

---

This is a continuation-in-part of my copending application Ser. No. 689,812, which was filed on Dec. 12, 1967, and which is now U.S. Pat. 3,641,050, Feb. 8, 1972, and of my copending application Ser. No. 141,999, which was filed on May 10, 1971.

This invention relates to N-(substituted indazolyl-N¹-methyl)alkyleneimines and to the use of these compounds as biocides.

In accordance with this invention it has been found that N-(substituted indazolyl-N¹-methyl)alkyleneimines are effective in the control of the growth of bacteria, fungi, and other microorganisms. These compounds may be represented by the structural formula

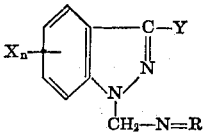

wherein X represents chlorine, bromine, fluorine, iodine, nitro, amino, acetamino, aroylamino, or (halobenzylidene)amino; Y represents hydrogen, chlorine, bromine, fluorine, or iodine; R represents an alkylene group having from 4 to 8 carbon atoms; and n represents an integer in the range of zero to 2.

Particularly effective as biocides are the compounds represented by the structural formula

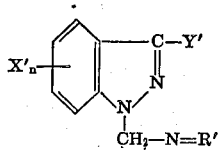

wherein X' represents nitro, chlorine, or (chlorobenzylidene)amino; Y' represents hydrogen or chlorine; R' represents a branched or unbranched alkylene group having 5 or 6 carbon atoms; and n represents an integer in the range of zero to 2. Illustrative of these preferred compounds are the following N-(3-chloroindazolyl-N¹-methyl)piperidine,
N-(3-chloro-5-nitroindazolyl-N¹-methyl)piperidine,
N-(5,6-dinitroindazolyl-N¹-methyl)piperidine,
N-(6-nitroindazolyl-N¹-methyl)piperidine,
N-(5-chloroindazolyl-N¹-methyl)-3-methylpiperidine,
N-(3-chloroindazolyl-N¹-methyl)hexamethyleneimine,
N-(5-chloroindazolyl-N¹-methyl)hexamethyleneimine,
N-(6-chloroindazolyl-N¹-methyl)hexamethyleneimine,
N-(3,5-dichloroindazolyl-N¹-methyl)hexamethyleneimine,
N-(3,6-dichloroindazolyl-N¹-methyl)hexamethyleneimine,
N-(3,5,6-trichloroindazolyl-N¹-methyl)hexamethyleneimine,
N-(3-chloro-5-nitroindazolyl-N¹-methyl)hexamethyleneimine,
N-(3-chloro-6-nitroindazolyl-N¹-methyl)hexamethyleneimine,
N-(3,5-dichloroindazolyl-N¹-methyl)hexamethyleneimine,
N-(5,6-dinitroindazolyl-N¹-methyl)hexamethyleneimine, and the like.

The novel compounds may be prepared by any suitable and convenient procedure. For example, they may be prepared by heating the appropriate N¹-hydroxymethyl-substituted-indazole with an alkyleneimine. The reaction is preferably carried out in a solvent, such as benzene, toluene, pyridine, or acetone, at the reflux temperature of the reaction mixture. The N¹-hydroxymethyl-substituted-indazoles may be prepared by the procedure described in my copending application Ser. No. 589,235, now U.S. Pat. 3,637,736, issued Jan. 12, 1972, which was filed on Oct. 25, 1966.

The compounds of this invention can be used to control the growth of a wide variety of bacteria, fungi, and other microorganisms. They are of particular value as biocides in surface-coating compositions including both organic-solvent-based and water-based coating systems.

In a preferred embodiment of the invention, the novel compounds are used as biocides in aqueous compositions that contain about 10 percent to 60 percent by weight of a water-insoluble resinous binder that is a synthetic linear addition polymer and/or an oleoresinous binder. The useful aqueous dispersions of synthetic linear addition polymers are ordinarily prepared by the emulsion polymerization of monoethylenically-unsaturated monomers. Illustrative of these polymers are polyvinyl acetate; polyvinyl butyrate; polyvinyl chloride; copolymers of vinyl acetate with vinyl chloride or acrylonitrile; copolymers of vinyl chloride with acrylonitrile or vinylidene chloride; polyethylene; polyisobutylene; copolymers of styrene with butadiene, acrylonitrile, or maleic anhydride; copolymers of acrylic acid esters or methacrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid; and mixtures thereof. Suitable oleoresinous binders include drying oils, bodied drying oils, oleo-resinous varnishes, alkyd resins, and mixtures thereof.

In another preferred embodiment of the invention, the novel compounds are used as the biocides in organic-solvent-based systems that contain an oleoresinous binder as hereinbefore defined.

Only a small concentration of the biocidal compound is required to protect the surface-coating composition from attack by microorganisms. As little as 0.10 percent of one or more of these compounds, based on the weight of the composition, will bring about an appreciable improvement in the resistance of the composition to attack by microorganisms. Five percent or more of the biocidal compounds can be used, but these larger amounts generally do not provide further improvement in the properties of the surface-coating compositions and for this reason are not ordinarily used. While the amount of the biocidal compounds that will provide optimum protection for a surface-coating composition depends upon such factors as the choice of biocidal compound, the choice of resinous binder and other ingredients of the composition and the amount of each that is used, and the application for which the coating composition is intended, in most cases about 0.25 percent to 2 percent of the biocidal compound, based on the weight of the surface-coating composition, is used.

In addition to the resinous binder and the biocidal compound, the surface-coating compositions may contain various auxiliary materials, such as pigments, extenders, solvents, dyes, defoaming agents, driers, emulsifiers, plasticizers, and the like in the amounts ordinarily used for these purposes.

The biocidal compounds may be incorporated into the surface-coating compositions by an convenient procedure. For example, they can be combined with the pigments and other ingredients to form a pigment phase that is mixed with the resinous binder and water or organic solvent to form the surface-coating composition. Alternatively, they can be added to a composition that contains the resinous binder, pigment, and water or organic solvent. The biocidal compounds can be added as such to the other ingredients, or they can be added as a solution in, for example, an alcohol, ether, hydrocarbon, or ketone.

The invention is further illustrated by the following examples:

EXAMPLE 1

To 200 ml. of toluene, which had been dried by azeotropic distillation, was added with stirring 18.3 grams (0.1 mole) of $N^1$-hydroxymethyl-3-chloroindazole and 10 grams (0.1 mole) of hexamethyleneimine. The reaction mixture was heated at its reflux temperature until 1.8 ml. of water had been evolved and then for an additional 30 minutes at this temperature. The reaction mixture was then heated on a water bath under reduced pressure until it reached constant weight. There was obtained 27.7 grams of N-(3-chloroindazolyl-$N^1$-methyl)hexamethyleneimine, which contained 63.35 percent C, 6.51 percent H, and 15,62 percent N (calculated, 65.2 percent C, 6.52 percent H, and 15.2 percent N).

EXAMPLE 2

A mixture of 125 ml. of dry toluene, 18.3 grams (0.1 mole) of $N^1$-hydroxymethyl-5-chloroindazole, and 10 grams (0.1 mole) of hexamethyleneimine was heated at its reflux temperature until the theoretical quantity (1.8 ml.) of water had been evolved and then for an additional 30 minutes at this temperature. The reaction mixture was heated on a water bath under reduced pressure until it reached constant weight. There was obtained a 100 percent yield of N-(5-chloroindazolyl-$N^1$-methyl)hexamethyleneimine, a liquid which solidified on standing. The product contained 64.1 percent C, 6.75 percent H, 16.5 percent N, and 13.5 percent Cl (calculated, 65.2 percent H, 15.2 percent N, and 12.8 percent Cl).

EXAMPLE 3

A mixture of 125 ml. of dry toluene, 18.3 grams (0.1 mole) of $N^1$-hydroxymethyl-3,5-dichloroindazole, and 10 grams (0.1 mole) of hexamethyleneimine was heated at its reflux temperature until 1.8 ml. of water had been evolved and then for an additional 30 minutes at this temperature. The reaction mixture was treated with decolorizing carbon and filter aid and then heated on a water bath under reduced pressure until it reached constant weight. There was obtained a 97.3 percent yield of N-(3,5-dichloroindazolyl-$N^1$ - methyl)hexamethyleneimine, which melted at 34°–35° C.

EXAMPLES 4–9

A series of N-(substituted indazolyl-$N^1$-methyl)hexamethyleneimines was prepared by the procedures described in Examples 2 and 3. The compounds prepared and their properties are given in Table I.

TABLE I

| Example number | Compound | Method of preparation | Yield (percent) | Melting point (° C.) |
| --- | --- | --- | --- | --- |
| 4 | N-[6-(3,4-dichlorobenzylidene)aminoindazolyl-$N^1$-methyl]hexamethyleneimine. | Example 2 | 100.0 | Oil |
| 5 | N-(3-chloro-5-nitroindazolyl-$N^1$-methyl)hexamethyleneimine. | do | 98.7 | (a) |
| 6 | N-(3-chloro-6-nitroindazolyl-$N^1$-methyl)hexamethyleneimine. | Example 3 | 95.3 | 74–81 |
| 7 | N-(5-nitroindazolyl-$N^1$-methyl)hexamethyleneimine | do | 93.5 | 72–82 |
| 8 | N-(6-nitroindazolyl-$N^1$-methyl)hexamethyleneimine | do | 91.7 | 73–83 |
| 9 | N-(5,6-dinitroindazolyl-$N^1$-methyl)hexamethyleneimine | do | 96.6 | 87–96 | a Semisolid.

EXAMPLE 10

A mixture of 200 ml. of benzene, 18.3 grams (0.1 mole) of $N^1$-hydroxymethyl-5,6-dinitroindazole, and 9.2 grams (0.11 mole) of piperidine was heated at its reflux temperature until the theoretical quantity (1.8 ml.) of water had been evolved and then for an additional 75 minutes at this temperature. The reaction mixture was heated on a water bath under reduced pressure until it reached constant weight. There was obtained 29 grams (95.3 percent yield) of N-(5,6-dinitroindazolyl-$N^1$-methyl)piperidine, which melted at 130–133° C. and contained 50.48 percent C, 4.90 percent H, and 22.7 percent N (calculated, 51.1 percent C, 4.92 percent H, and 22.95 percent N). The structure of the compound was confirmed by infra-red analysis.

EXAMPLE 11

A mixture of 19 grams (0.0985 mole) of $N^1$-hydroxymethyl-6-nitroindazole and 21.3 grams (0.25 mole) of piperidine was heated on a boiling water bath for 30 minutes and then cooled to room temperature. When 100 ml. of water had been added to the reaction mixture, it separated into aqueous and oil phases. The oil phase was separated, and it solidified on standing. It was filtered, washed with water, and vacuum dried at 60° C. The resulting crude product was recrystallized from ligroin. There was obtained 24 grams (93.8 percent yield) of N-(6-nitroindazolyl-$N^1$ - methyl)piperidine, which melted at 94–96° C. and contained 59.98 percent C, 6.19 percent H, and 22.05 percent N (calculated, 59.9 percent C, 6.15 percent H, and 22.15 percent N). The structure of the compound was confirmed by infra-red analysis.

EXAMPLES 12–18

A series of N-(substituted indazolyl-$N^1$-methyl)piperidines was prepared by the procedures described in Examples 10 and 11. In each case the structure of the compound was confirmed by infra-red analysis. The compounds prepared and their properties are given in Table II.

(C) An exterior house paint was prepared by mixing together the following materials:

| | Parts by weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent | 2 |
| Manganese naphthenate (6%) | 2.27 |
| Lead naphthenate (24%) | 11.3 |

TABLE II

| Example number | Compound | Method of preparation | Yield (percent) | Melting point (° C.) | Found, percent C | H | N | Cl | Calculated, percent C | H | N | Cl |
|---|---|---|---|---|---|---|---|---|---|---|---|---|
| 12 | N-(3-chloroindazolyl-$N^1$-methyl)piperidine. | Example 10 | 100.0 | | | | | | | | | |
| 13 | N-(3-chloro-5-nitroindazolyl-$N^1$-methyl)piperidine. | Example 11 | 96.7 | 106–114 | 54.99 | 5.25 | 20.09 | | 52.8 | 5.08 | 18.95 | |
| 14 | N-(5-nitroindazolyl-$N^1$-methyl)piperidine. | ...do... | 91.0 | 89–91 | 60.6 | 6.18 | 22.4 | | 60.0 | 6.15 | 21.6 | |
| 15 | N-(5-chloroindazolyl-$N^1$-methyl)piperidine. | ...do... | 97.8 | 104–105 | | | 16.1 | 13.6 | | | 16.8 | 14.2 |
| 16 | N-(3,5-dichloroindazolyl-$N^1$-methyl)piperidine. | ...do... | 96.0 | 75–78 | 53.93 | 4.58 | 14.7 | 25.7 | 54.8 | 5.28 | 14.8 | 25.0 |
| 17 | N-(5-chloroindazolyl-$N^1$-methyl)-3-methylpiperidine. | ...do... | 92.2 | 59–65 | 62.9 | 6.50 | 15.53 | 14.39 | 63.7 | 6.83 | 15.9 | 13.45 |
| 18 | N-(5,6-dinitroindazolyl-$N^1$-methyl)-3-methylpiperidine. | Example 10 | 99.0 | 108–115 | 53.27 | 5.27 | 21.3 | | 51.1 | 5.17 | 21.3 | |

EXAMPLE 19

(A) A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% aqueous solution of methylcellulose | 200 |
| Diethyl ether of diethylene glycol | 37 |
| 55% aqueous dispersion of polyvinyl acetate | 350 |

To samples of this paint was added 2 percent by weight of either one of the compounds of this invention or a comparative biocide.

(B) An acrylic paint was prepared by mixing together the following materials:

| | Parts by weight |
|---|---|
| Titanium dioxide | 1136 |
| Mica (325 mesh waterground) | 136 |
| Calcium carbonate | 568 |
| Water | 699 |
| 2% aqueous solution of sodium salt of maleic anhydride/diisobutylene copolymer (Tamol 731) | 41 |
| Alkyl aryl polyether surfactant (Triton CF–10) | 9 |
| Antofoam agent (Colloid 581B) | 18 |
| Ethylene glycol | 9.1 |
| Hydroxyethyl cellulose (Cellosize QP 4400) | 9.1 |
| Ammonium hydroxide (28% aqueous solution) | 9 |
| Aqueous dispersion containing 43% by weight of the ammonium salt of a copolymer of 66% by weight of ethyl acrylate, 32.5% by weight of methyl methacrylate, and 1.5% by weight of acrylic acid containing 3% by weight of tert. octylphenoxypolyethoxyethanol | 2486 |

To samples of this paint was added 2 percent by weight of either one of the compounds of this invention or a comparative biocide.

To samples of this paint was added 2 percent by weight of either one of the compounds of this invention or a comparative biocide.

EXAMPLE 20

Samples of the paints whose preparation was described in Example 19 were evaluated by the following procedure: Pieces of drawdown paper were dipped into the paint, dried for 24 hours, and again dipped into the paint. After a 24-hour drying period, the coated paper samples were cut into 1¼ inch squares. Each of the coated paper squares was placed on a plate of malt and mycophil agar, which had been inoculated with 1 ml. of a suspension of the test organism. The plates, prepared in triplicate, were incubated at 28° C. and observed weekly. The growth was estimated according to the following key, and the results of the triplicate plates were averaged. In the tables that follow ZO=Zone of inhibition in mm.
O=No zone of inhibition
Tr=Trace zone of inhibition
—=Not tested
Bacteria A—*Bacillus subtilis*
Bacteria B—*Aerobacter aerogenes*
Bacteria C—*Pseudomonas aeruginosa*
Bacteria D—Mixed inoculum consisting of *P. aeruginosa* ATCC 10145, *A. aerogenes* ATCC 7256, and three unidentified strains of Bacillus
Fungi E—*Pullularia pullulans*
Fungi F—*Penicillium crustosum*
Fungi G—*Aspergillus niger*

The compounds tested and the results obtained are given in Table III.

TABLE III

| Biocide | Paint | Effect on Paint | | Biocidal activity | | | | | | |
|---|---|---|---|---|---|---|---|---|---|---|
| | | | | Bacteria | | | | Fungi | | |
| | | pH | Color | A | B | C | D | E | F | G |
| Product of Example: | | | | | | | | | | |
| 1 | PVA | 8.4 | Off-white | ZO-6 | ZO-5 | ZO-2 | — | Tr | ZO-6 | ZO-2 |
| | Acrylic | 9.3 | do | ZO-3 | ZO-1 | ZO-2 | — | ZO-2 | ZO-3 | ZO-1 |
| | Oil | | do | — | — | — | — | ZO-4 | ZO-5 | ZO-2 |
| 6 | PVA | 8.2 | Yellow | ZO-6 | ZO-2 | ZO-1 | ZO-5 | — | — | — |
| | Acrylic | 9.7 | do | ZO-3 | Tr | — | ZO-4 | Tr | Tr | Tr |
| | Oil | | do | — | — | — | — | ZO-1 | ZO-1 | Tr |
| 7 | PVA | 8.3 | Off-white | ZO-5 | ZO-1 | Tr | ZO-5 | — | — | — |
| | Acrylic | 9.6 | Beige | ZO-5 | ZO-1 | Tr | ZO-3 | Tr | Tr | Tr |
| | Oil | | do | — | — | — | — | ZO-5 | ZO-3 | Tr |
| 8 | PVA | 8.4 | Yellow | ZO-6 | ZO-3 | ZO-1 | ZO-3 | — | — | — |
| | Acrylic | 9.7 | Beige | ZO-3 | Tr | — | ZO-5 | Tr | Tr | Tr |
| | Oil | | do | — | — | — | — | ZO-1 | ZO-2 | Tr |
| 9 | PVA | 8.3 | Yellow | ZO-2 | ZO-1 | ZO-2 | ZO-7 | — | — | — |
| | Acrylic | 9.7 | do | ZO-5 | ZO-1 | — | ZO-3 | Tr | Tr | Tr |
| | Oil | | do | — | — | — | — | Tr | Tr | Tr |
| 12 | PVA | 8.5 | White | ZO-3 | ZO-3 | ZO-1 | ZO-4 | Tr | ZO-2 | Tr |
| | Acrylic | 9.7 | do | Tr | ZO-4 | ZO-4 | ZO-1 | ZO-1 | ZO-6 | ZO-1 |
| | Oil | | do | — | — | — | — | Tr | Tr | Tr |
| Bis(phenylmercury)-dodecenylsuccinate (Super Ad-It) | PVA | 6.9 | Off-white | ZO-10 | ZO-2 | ZO-7 | — | ZO-17 | ZO-6 | ZO-13 |
| | Acrylic | 8.4 | do | ZO-9 | — | ZO-5 | — | ZO-9 | ZO-1 | ZO-10 |
| | Oil | | do | — | — | — | — | ZO-8 | ZO-10 | ZO-10 |
| 2,3,5,6-Tetrachloro-4-(methyl-sulfonyl)-pyridine (Dow 1013) | PVA | 7.3 | Off-white | ZO-8 | 0 | 0 | — | ZO-13 | ZO-10 | ZO-9 |
| | Acrylic | 9.2 | do | ZO-8 | 0 | 0 | — | ZO-13 | ZO-7 | ZO-6 |
| | Oil | | Beige | — | — | — | — | ZO-12 | ZO-10 | ZO-6 |

Each of the other N-(substituted indazolyl-N¹-methyl)-alkyleneimines herein disclosed can be used in a similar manner to inhibit or prevent the growth of microorganisms in surface-coating compositions.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A compound having the structural formula

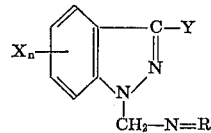

wherein X represents halogen, nitro, amino, acetamino, aroylamino, or (halobenzylidene)amino; Y represents hydrogen or halogen; R represents an alkylene group having from 4 to 8 carbon atoms; $n$ represents an integer in the range of zero to 2; and when $n$ represents zero, Y represents halogen.

2. A compound as set forth in claim 1 that has the structural formula

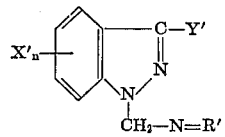

wherein X' represents nitro, chlorine, or (chlorobenzylidene)amino; Y' represents hydrogen or chlorine; R' represents an alkylene group having from 5 to 6 carbon atoms; $n$ represents an integer in the range of zero to 2; and when $n$ represents zero, Y' represents chlorine.

3. A compound as set forth in claim 2 wherein —N=R' represents a piperidine group.

4. A compound as set forth in claim 2 wherein —N=R' represents a hexamethyleneimine group.

5. A compound as set forth in claim 2 wherein X' is chlorine and $n$ is 1.

6. A compound as set forth in claim 2 wherein X' is nitro and $n$ is 1.

7. The compound as set forth in claim 2 that is N-(3-chloroindazolyl-N¹-methyl)piperidine.

8. The compound as set forth in claim 2 that is N-(3-chloro-6-nitroindazolyl-N¹-methyl)hexamethyleneimine.

9. The compound as set forth in claim 2 that is N-(3,5-dichloroindazolyl-N¹-methyl)hexamethyleneimine.

10. The compound as set forth in claim 2 that is N-(5,6-dinitroindazolyl-N¹-methyl)hexamethyleneimine.

11. The compound as set forth in claim 2 that is N-(5-chloroindazolyl-N¹-methyl)-3-methylpiperidine.

References Cited

German Offenlegungsschrift No. 1,814,335, pub. Aug. 14, 1969, 1–2, 4, 8, and 15–16 relied upon.

Ortho et al.: J. of Pharm. Sci., vol. 57, p. 1814 to 1817 (1968).

Auwers et al.: Chemical Abstracts, vol. 20, pages 2496 to 2498 (1926) (abstract of original article in Ber. 59B, 539–55 (1926).

JOHN D. RANDOLPH, Primary Examiner

U.S. Cl. X.R.

106—15, 17; 424—267, 273; 260—45.8 N, 240 G, 310 C